Feb. 20, 1923. 1,446,399
A. H. SMITH
MANUFACTURE OF SMALL SHEET METAL ARTICLES BY PRESSING
Filed Nov. 7, 1921 4 sheets-sheet 1
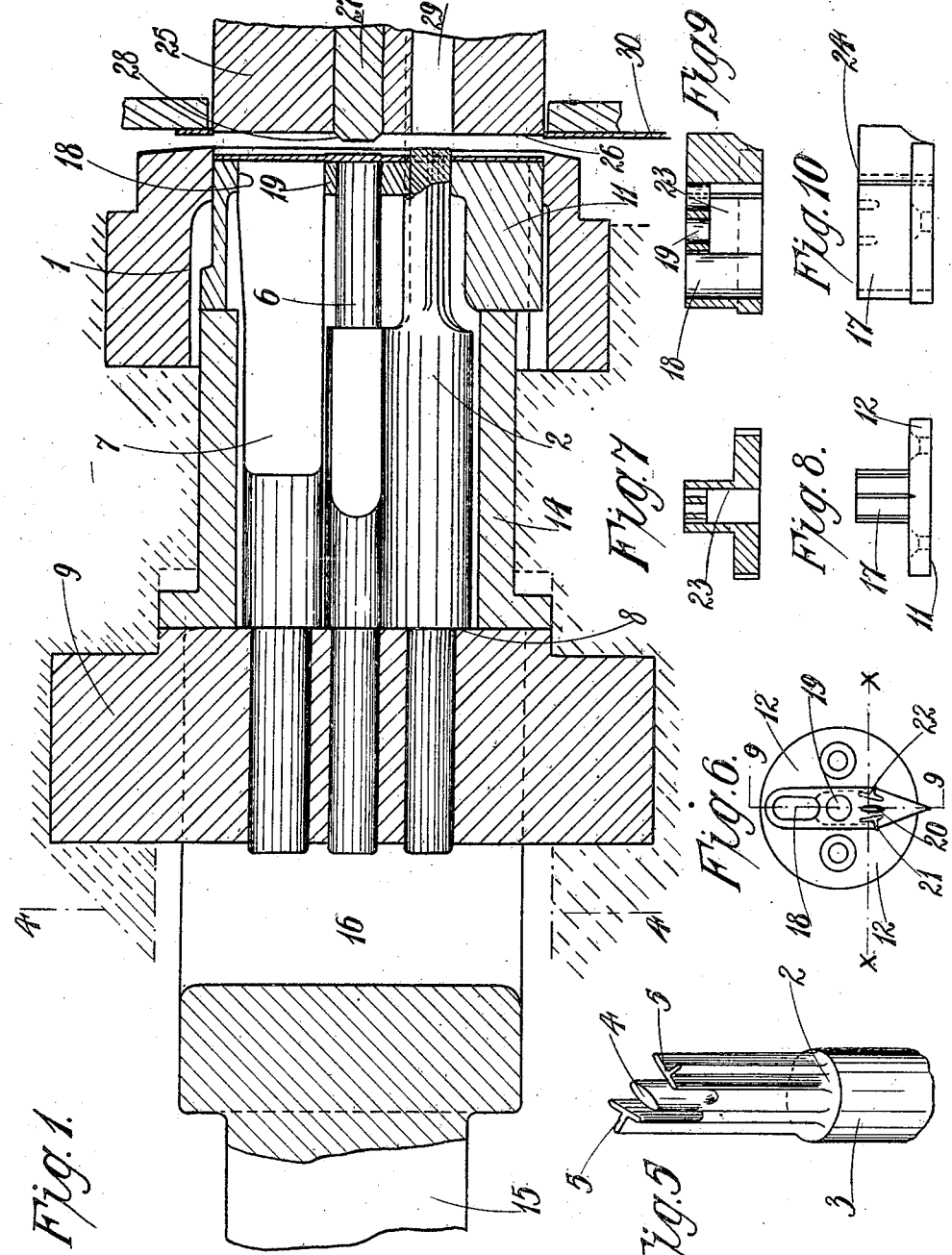

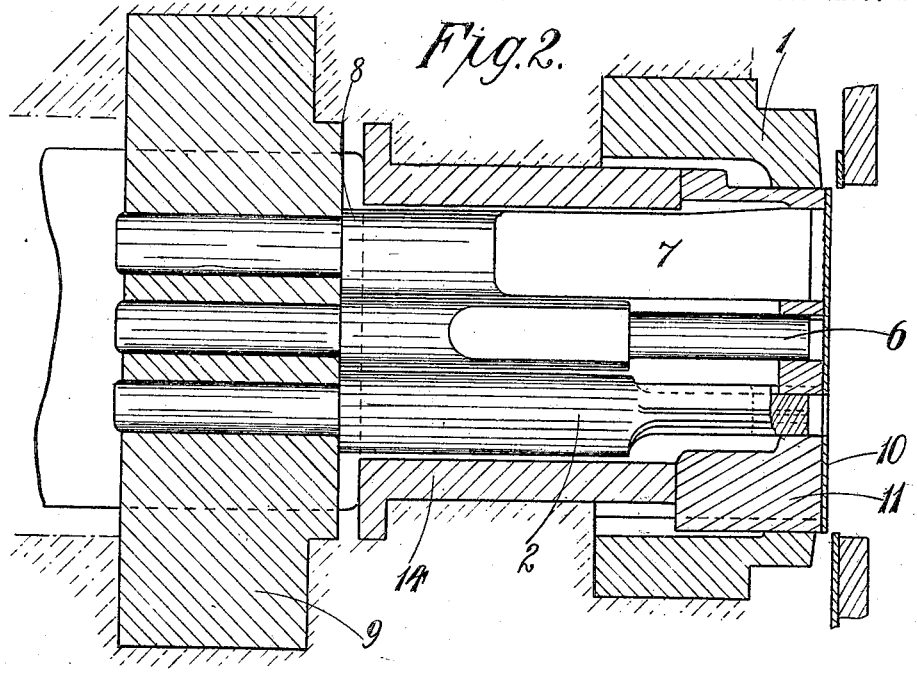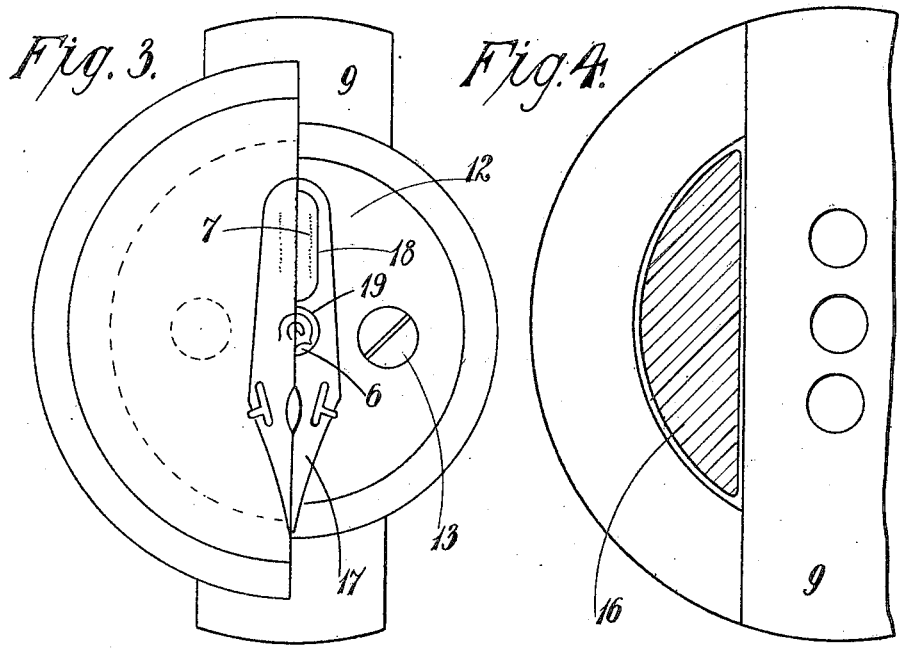

Feb. 20, 1923.
A. H. SMITH
1,446,399
MANUFACTURE OF SMALL SHEET METAL ARTICLES BY PRESSING
Filed Nov. 7, 1921   4 sheets-sheet 3
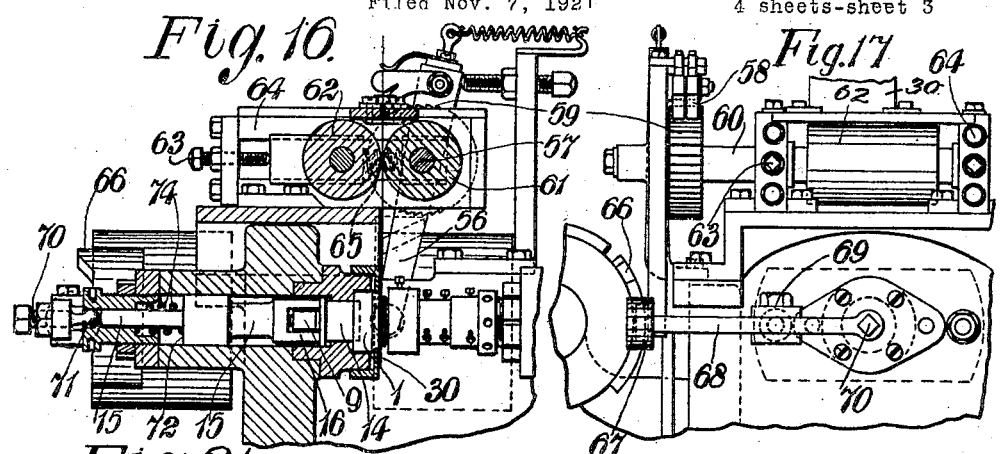
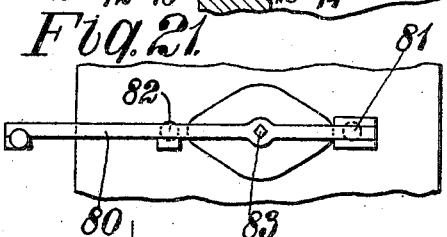
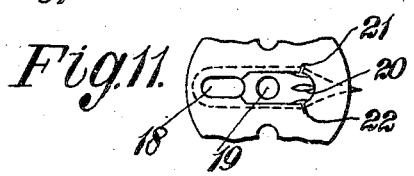
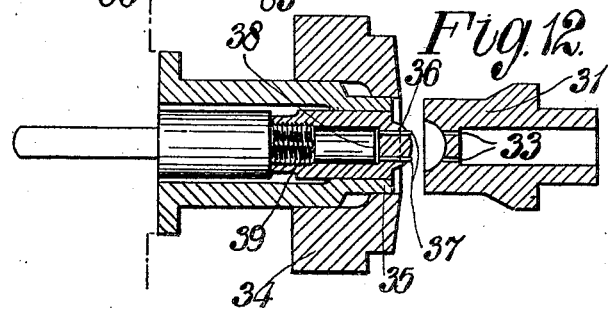
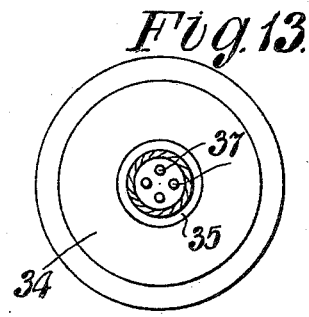
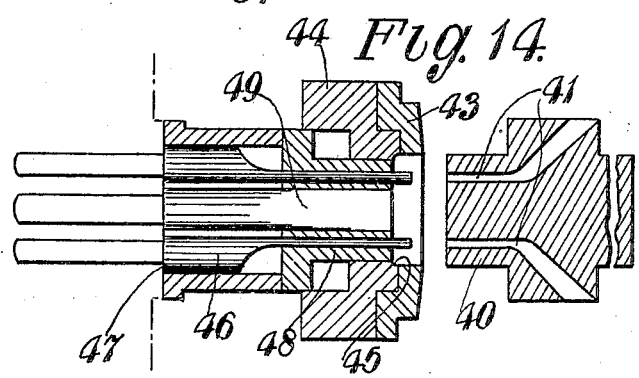
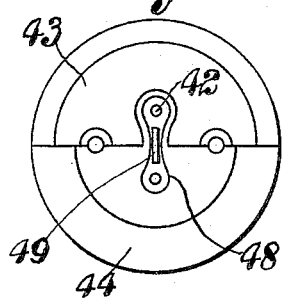
Inventor.
Albert Henry Smith,
By B. Singer
Atty.

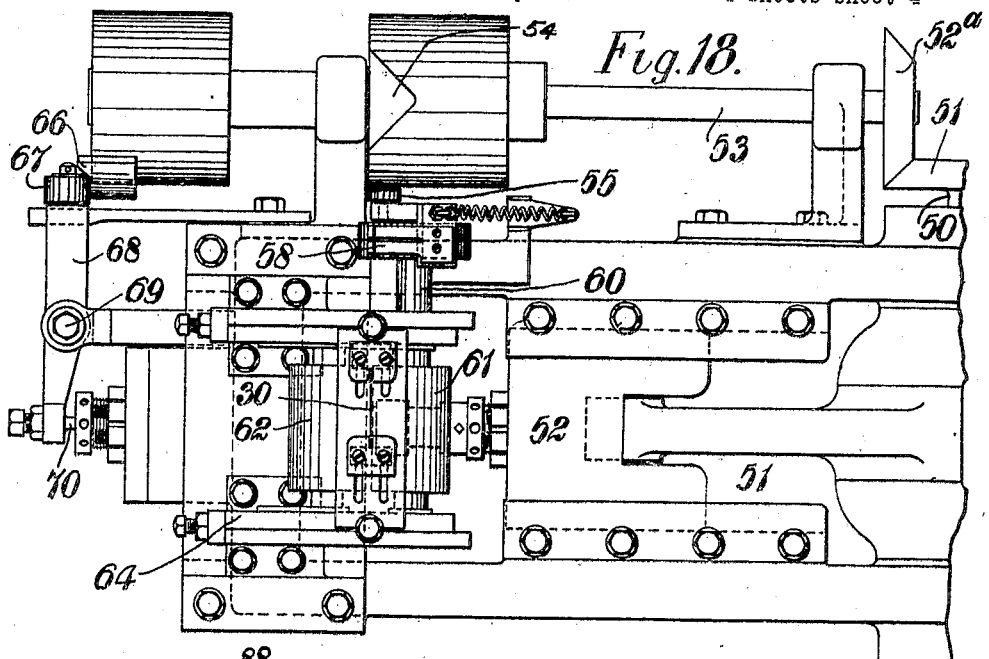
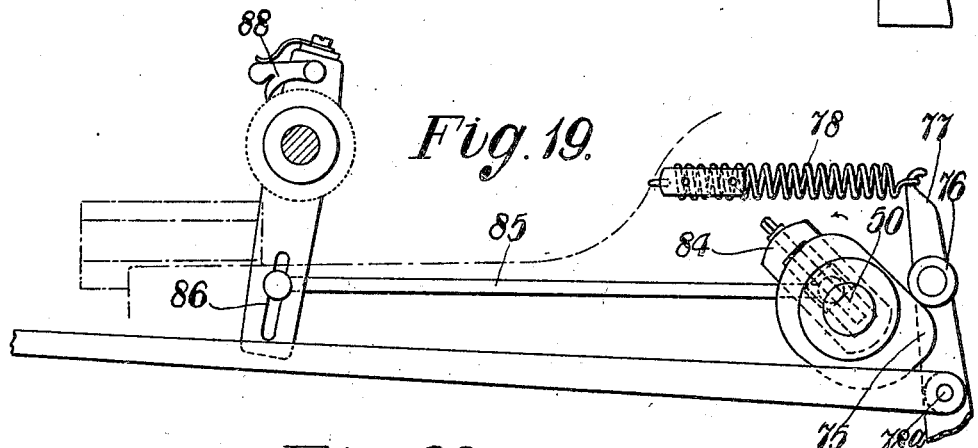
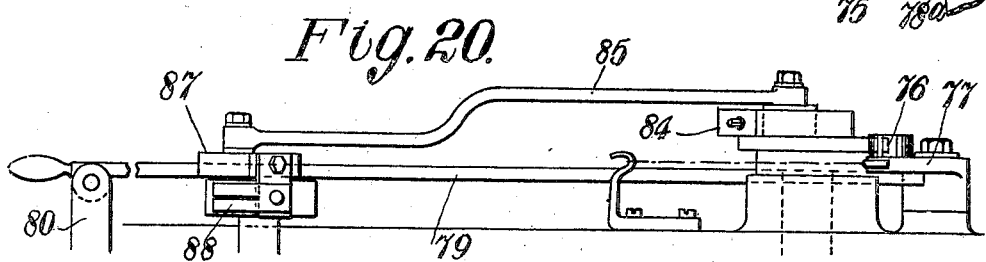

Patented Feb. 20, 1923.

1,446,399

UNITED STATES PATENT OFFICE.

ALBERT HENRY SMITH, OF BIRMINGHAM, ENGLAND.

MANUFACTURE OF SMALL SHEET-METAL ARTICLES BY PRESSING.

Application filed November 7, 1921. Serial No. 513,454.

*To all whom it may concern:*

Be it known that I, ALBERT HENRY SMITH, a subject of the King of Great Britain, residing at 7 Smallbrook Street, Birmingham, in the county of Warwick, England, have invented certain new and useful Improvements in the Manufacture of Small Sheet-Metal Articles by Pressing; and I do hereby declare the following to be a full, clear, and exact description of the same.

This invention relates to the manufacture of small sheet or strip metal articles by pressing and has for its object to provide an improved method and means for such manufacture whereby the articles can be made more expeditiously than at present.

Where the manufacture of sheet or strip metal articles by pressing involves the operations of cutting a blank, piercing, embossing, and possibly other shaping or cutting operations it is the present practice to carry out these operations successively and an important feature of the present invention consists in performing these steps in the manufacture at one operation.

According to this part of my invention I employ a pair of dies which cut out the blank, the one die also carrying one or more tools for piercing and for marking or similar operations and also means for removing the cut out blank from the die, all of said operations being performed during the one motion of the dies.

In order to carry out this part of my invention I employ a pair of dies or die and punch, at least one of which is movable to and from the other, the die or one of said dies comprising one or more tools for piercing, or embossing, or marking, or tools for any two or all of these purposes, and an ejector member which is movable in relation to said tools, and the metal or material of which the articles are to be manufactured is fed between these dies or die and punch which are then forced towards each other to cut out the blank, pierce and perform any other necessary operations and eject at one operation of the press or machine. The whole of the operations upon the metal or material do not necessarily take place simultaneously as a portion of the stroke of the press or machine may be used for performing some operations and another portion or other portions of the stroke may be employed for performing other operations.

Another feature of my invention and one which is applicable to the manufacture of sheet metal articles generally where a blank is cut out by a pair of dies, is to provide an ejector for removing the blank from the dies, which ejector is actuated positively. Means may be provided for adjusting such an ejector either in regard to the length of its stroke or the moment at which it comes into operation.

Referring to the drawings:—

Figure 1 is a sectional plan view showing the dies employed in pen making.

Figure 2 is a similar view to Figure 1 showing the ejector in its projected position.

Figure 3 is an end view corresponding with Figure 2, the right hand half showing the outer member of the die removed.

Figure 4 is a sectional end view on line 4—4 of Figure 1.

Figure 5 is a perspective view showing the tool employed for piercing and slitting the blank.

Figure 6 is an end view of the ejector.

Figure 7 is a sectional view of the ejector on line X—X of Figure 6.

Figure 8 is an external elevation corresponding with Figure 7.

Figure 9 is a sectional view of the ejector taken on line 9—9 of Figure 6.

Figure 10 is a side view of the ejector.

Figure 11 is an end view of the ejector showing the opposite end from that illustrated in Figure 6.

Figure 12 is a sectional plan view showing the dies employed in button making.

Figure 13 is an end view of the compound die shown in Figure 12.

Figure 14 is a sectional plan view showing the dies employed in making the side links of sprocket chains.

Figure 15 is an end view of the compound die shown in Figure 14, the lower half having the outer ring removed.

Figure 16 is a sectional view in side elevation showing one form of machine in which the dies can be employed.

Figure 17 is an end view corresponding with Figure 16.

Figure 18 is a plan view corresponding with Figure 16.

Figure 19 is a side elevation showing an alternative method of driving the feed mechanism for the stock and of operating the ejector.

Figure 20 is a plan view of the apparatus shown in Figure 19.

Figure 21 is a view looking on the end of the machine illustrated in Figures 19 and 20.

My invention is particularly applicable to the manufacture of steel pens. In the manufacture of some kinds of steel pens it is necessary to cut out a blank, to pierce the blank, to make certain cuts at the edges of the blank, and also usually to emboss a letter or mark upon the blank, and to stamp certain words upon the blank. According to my invention any two or more of these operations may be carried out at one stroke of a power or hand press whereas they have hitherto been carried out by successive strokes in a hand press or by "follow on" tools in a power press.

The manufacture of steel pens in accordance with the present invention is illustrated in Figures 1 to 11 and Figures 17 to 21, and referring to Figures 1 to 11 I employ a pair of dies or punch and die one of which 1 has fixed therein a tool 2 to effect the piercing and cutting. This tool is shown clearly in Figure 5 and comprises a shank 3 from the end of which projects a piercer 4 and two parts 5 of T section which are used for cutting slits at the edges of the pen. Fixed in this die 1 are also a tool 6 used for embossing, and a tool 7 for stamping or marking words upon the blank. These members are all mounted so as to be stationary in the machine, each having a shoulder 8 upon its shank which abuts against a stationary cross bar 9. The tool 2 which makes the slits at the edges of the blank and pierces the blank projects as far as the face of the die 1 whilst the tools 6 and 7 used for embossing and marking are set back from the face of the die 1 so that the severed blank 10 is pierced and cut before being embossed and marked.

The tools 2, 6 and 7 are slidably mounted in an ejector 11 which itself can slide in the fixed die 1. The ejector 11 is illustrated in detail in Figures 6 to 11 and it incorporates a flange 12 at the rear which is secured by screws 13 to a sleeve 14 which is periodically given an endwise movement by a slide 15 which is forked at 16 to clear the cross bar 9. The ejector 11 comprises a projecting portion 17 which is provided with a hole 18 for the stamping or marking tool 7 and a hole 19 for the embossing tool 6. The ejector also has three separate holes 20, 21 and 22 of the necessary shape in cross section to correspond with the cross section of the piercer 4 and the two slitting portions 5 of the tool 2. The walls of the holes 18, 19, 20, 21 and 22 through the ejector serve to support the tools 2, 6 and 7. As will be seen clearly from Figures 7 and 9, the ejector is provided with a cavity or hollow interior 23 allowing the tools 2, 6 and 7 to be advanced after they have been re-ground. The end of the projecting portion 17 of the ejector must not be larger than the outline of the article being manufactured and it is preferably provided with a face 24 which corresponds in shape and size with the article being manufactured so that when the ejector is in operation for moving the blank away from the faces of the tools 2, 6 and 7 there is no tendency to bend the blank.

Co-operating with the die which includes the members 1, 11, 2, 6 and 7 is a reciprocating die 25 having an end face 26 which corresponds in shape to the article being manufactured. Fixed in the die 25 is a tool 27 the end face 28 of which is shaped to correspond with the end face of the embossing tool 6. The die 25 is also provided with holes 29 which correspond in shape with the end faces of the parts 4 and 5.

In operation the strip material or stock 30 is fed by means hereinafter described between the faces of the dies 25 and the compound die which can be designated as a whole by the reference numeral 1. The stock is fed into position and stopped and the die 25 is moved towards the die 1. The embossing punch here comes into operation by gathering the material or causing a depression in same before the blank is actually cut; this materially assists in forming a sound indent in the embossing of a letter or figure as required. The blank is then severed by a shearing action taking place between the die 25 and the outer member 1. The die 25 continues to move to the left and the piercing tool 4 and the slitting tools 5 come into operation either simultaneously with the severing of the die or immediately afterwards. After the blank is severed from the strip and also preferably after the piercing and slitting operations have been carried out, the embossing tools 27 and 6 come into operation as also does the marking tool 7. The die 25 now receives and the ejector 11 is moved to the right by means hereinafter described thus removing the completed blank from the tools 4 and 5. When the completed blank has moved clear of these tools it will drop down by gravity from between the dies or as the strip is fed forward for another blank to be made, it clears naturally.

As will be seen from the drawings, the face of the outer member 1 is preferably ground so as to give a slight lead to the shearing edge. Any of the tools 2, 6 or 7 can be re-shaped or re-ground and adjusted by placing packing between the shoulders 8 and the cross bar 9 or by a screw adjustment fixed to the cross bar.

Referring to Figures 12 and 13 which illustrate dies for the making of buttons, in this case the blank has to be severed, formed into a cup shape, pierced, and in some cases marked. These dies comprise a member 31 which is given a reciprocating movement similar to the die 25. The end face of the member 31 is provided with a part spherical recess 32 and holes 33.

The other or compound die comprises a stationary outer member 34, an ejector 35, a cupping member 36 and piercing tools 37. The piercing tools consist of pins having heads 38 which are clamped by a screw 39 so that if any of the tools breaks it can be replaced individually. There is no relative movement between the member 37 and the member 36 and they are only made separately to facilitate replacing the piercing tools in the case of breakage or wear. The operation of this device is similar to that already described in making pens, the blank being severed by a shearing action between the members 31 and 34 and being cupped between the surfaces 32 and the part spherical projection on the end of the member 36. During the operation the necessary holes are formed by the piercers 37 which enter the holes 33. The ejector 35 is moved forwardly after the blank has been formed so as to remove it from the ends of the piercing pins 37 and allow it to drop from between the dies assisted by the feed action if necessary.

Referring to Figures 14 and 15 which show dies suitable for forming the side links of sprocket chains, the one die 40 is given a movement similar to the die 25 shown in Figure 1 and is provided with holes 41 which correspond in position to piercing pins 42 upon the compound die.

The compound die comprises an outer ring 43 which co-operates with the end face of the die 40 for shearing the blank out of the strip and a ring 44 which has a bevel face 45 for bevelling the edges of the blank. The piercing pins 42 are each provided with a shank 46 which has a shoulder 47 which abuts against a cross bar similar to the cross bar 9. The ejector 48 is provided with holes to accommodate the piercing pins and is given a movement for moving the blank clear of the ends of the pins 42 similar to the movement given to the ejector 11 as described with reference to Figure 1. The die may include a marking tool 49 or a third piercing punch which passes through a hole in the ejector and serves to mark upon the links any letters or words that may be required or pierce an oblong hole if required. The action of these dies is similar to the action of the dies already described.

In any of the constructions herein described and particularly that described with reference to Figures 12 and 13 the end face of the ejector may be engraved or otherwise treated so that it will serve the purpose of either marking the blank or article being manufactured or will act as a planisher upon the surface of the blank with which it comes into contact.

It will be understood that a set of the dies as described with reference to Figures 1 to 11 or to Figures 12 and 13 or Figures 14 and 15 are used in a machine which is designed to give the necessary movement in proper sequence to the stock and to one of the dies and to the ejector. Such a machine is illustrated by way of example in Figures 16, 17 and 18 and a modification thereof is shown in Figures 19, 20 and 21.

In the machine shown in Figures 16, 17 and 18, a crank shaft 50 is provided having a crank upon which is mounted a connecting rod 51. This connecting rod is connected to a sliding head 52 which carries a reciprocating die such as 25, 31 or 40. On the crank shaft 50 is mounted a bevel wheel 51 gearing with a bevel wheel 52$^a$ upon a longitudinal shaft 53 disposed at the side of the machine which carries and drives a cam 54 operating upon a roller 55 carried by a lever 56 pivoted at 57. The lever 56 carries at its upper end a pair of pivoted and spring pressed pawls 58 which operate upon a ratchet wheel 59. The ratchet wheel 59 is mounted on a shaft 60 passing transversely across the machine and the shaft 60 carries a driving roller 61 which co-operates with an adjustable roller 62. The rollers 61 and 62 can be adjusted to and from each other by a set screw 63, each roller being mounted in a bearing which can slide in a frame 64, a spring 65 being disposed between the two bearings. The stock or strip material 30 is fed between the rollers 61 and 62 and the mechanism comprising the cam 54 and the pawls 58 are arranged so that the stock is fed intermittently during the time when the reciprocating die 25, 31 or 40 is in its receded position.

The shaft 53 or a continuation thereof also carries a cam 66 operating upon a roller 67 carried by a lever 68 pivoted at 69 at the end of the machine. At its free end this lever carries an adjustable set screw 70 which has a spherical inner end 71 operating upon the slide 15 which moves the ejector with a positive action periodically and in the proper sequence. The adjustable set screw 70 provides a means whereby the travel of the ejector may be adjusted as required.

In Figure 16 between a shoulder 72 on the slide 15 and an abutment 73 may be applied a strong coiled spring 74 and in this construction the slide 15 is given its return movement by the forward movement of the die 25, 31 or 40 and the spring 74 would form a kind of cushion for the ejector. The slide 15 however, may be given a positive return movement instead of depending upon the forward movement of the die 25, 31 or 40.

Alternatively instead of operating the ejector positively, a spring such as 74 may be provided and the mechanism for positively moving the ejector may be omitted. In such a construction the normal position of the ejector would be that shown in Figure 2 wherein it is fully projected from the die. When in this position the ejector may be receiving pressure from the spring 74 and it may be retained against outward movement by a shoulder or the like on the ejector coming into contact with a shoulder or the like upon the interior of the die 1. In operation such an ejector would be pressed back by the co-operating die 25 or its equivalent and when such die recedes the ejector would follow it by reason of the pressure received from the spring 74. The movement of the ejector however, would cease as soon as it had reached its fully projected position so that the severed blank would then be free to drop from between the end of the ejector and the end of the die.

In the alternative arrangement illustrated in Figures 19, 20 and 21, the movements for feeding the stock and for the ejector instead of being obtained from a longitudinal shaft such as 53 are obtained from a cam 75 on the crank shaft 50. The cam 75 operates upon a roller 76 mounted on a lever 77 which is pulled by a spring 78 attached to a stationary part of the machine. In Figure 19 the pivoting point of the lever 77 is not shown and it may be considered to be at the lower end which is broken away. Pivotally attached at 78ª is a connecting link 79 operating upon a lever 80 at the end of the machine in a position somewhat similar to that occupied by the lever 68 shown in Figure 18. The lever 80 is pivoted at 81 and is provided with a stop 82. The lever 80 carries an adjustable set screw 83 which operates upon the slide 15. The slide 15 is moved with a positive action by the lever 80 and the set screw 13 provides a means for adjusting the travel of the slide and consequently of the ejector as may be required.

For feeding the stock the crank shaft 50 is provided with an adjustable crank 84 to which is connected a connecting rod 85. The other end of the connecting rod 85 is pivotally mounted in a slot 86 in a lever 87 carrying pawls 88 which are similar in action and purpose to the pawls 58.

The invention may also be applied to the manufacture of small nuts, washers and other like articles from strip or sheet material, only two operations being necessary, one of which consists in cutting the blank and the other of which consists in piercing. In this particular case the two operations may be performed simultaneously, by feeding the strip between a die and punch or pair of dies, one of which has a face similar to the face of the nut to be manufactured with a hole in said face similar to the hole required for the nut. The other die is a compound die comprising an outer body in which is slidably mounted a block shaped to correspond with the face of the nut called a pusher out, and within this body is slidably mounted a rod or piercer of a diameter equal to the diameter of the hole required for the nut. This rod or piercer is fixed and held stationary by a cross bar of suitable strength let into the compound die holder. The sliding block or the pusher out is made to shroud and support the piercing rod or rods, thereby giving assistance to delicate tools for piercing a number of holes at once, or for marking or embossing and ensuring an even pressure both when the material or stock is forced into the die and also when it is ejected therefrom.

What I claim then is:—

1. In a machine for the manufacture of sheet metal articles the combination of a movable die, a stationary die, means for advancing said movable die into engagement with the stationary die so as to sever a blank from stock, an ejector in said stationary die for removing the blank from the dies, and means for positively actuating said ejector.

2. In a machine for the manufacture of sheet metal articles the combination of a movable die, a stationary die, means for advancing said movable die into engagement with the stationary die so as to sever a blank from stock, a tool in said stationary dies for piercing, an opening in the movable die registering with the end of said tool, an ejector in said stationary die for removing the blank from the dies, said severing, piercing and ejecting operations being performed at one operation of the dies.

3. In a machine for the manufacture of sheet metal articles the combination of a movable male die, a stationary female die, means for advancing said movable male die into engagement with the other die so as to sever a blank from stock, a tool in said stationary female dies for marking or embossing the surface of the blank, an ejector in said stationary female die for removing the blank from the dies, said severing, marking or embossing and ejecting operations being performed at one operation of the dies.

4. In a machine for the manufacture of sheet metal articles the combination of a movable die, a stationary die, means for advancing said movable die into engagement with the stationary die so as to sever a blank from stock, an ejector in said stationary die for removing the blank from the dies, means for positively actuating said ejector, and means for adjusting said ejector.

5. In a machine for the manufacture of sheet metal articles the combination of a movable die, a stationary die, means for advancing said movable die into engagement with the stationary die so as to sever a blank from stock, a slidably mounted ejector in said stationary die for removing the blank from the dies, and means for actuating said ejector.

6. In a machine for the manufacture of sheet metal articles the combination of a movable die, a stationary die, means for advancing said movable die into engagement with the stationary die so as to sever a blank from stock, a slidably mounted ejector in said stationary die for removing the blank from the dies, a tool located in a hole in said ejector and carried by said stationary die for operating on the blank, said tool being mounted in a hole in the ejector, and means for actuating said ejector.

7. In a machine for the manufacture of sheet metal articles the combination of a movable die, a stationary die, means for advancing said movable die into engagement with the stationary die so as to sever a blank from stock, an ejector for removing the blank from the dies, said ejector forming a portion of the base of the stationary die and having its end surface constructed to act upon the surface of the blank, and means for actuating said ejector.

8. In a machine for the manufacture of sheet metal articles, the combination of a male die, a female die, means for moving one of said dies into engagement with the other die so as to sever a blank from stock, an ejector for removing the blank from the dies, at least one tool for operating on the blank, said tool being mounted in a hole in the ejector, means for actuating said ejector, and said female die being disposed around said ejector.

9. In a machine for the manufacture of sheet metal articles the combination of a movable die, a stationary die, a crank shaft and connecting rod for imparting reciprocating motion to said movable die so as to sever a blank from stock, means for feeding stock intermittently between said dies, an ejector in said stationary die for removing the blank therefrom, and cam driven means for imparting positive intermittent reciprocating motion to said ejector.

10. In a machine for the manufacture of sheet metal articles the combination of a movable die, a stationary die, means for advancing said movable die into engagement with the stationary die so as to sever a blank from stock, an ejector in said stationary die for removing the blank therefrom, and means for actuating said ejector, said dies being arranged substantially horizontally whereby the completed blank, when ejected, will drop by gravity from between them.

11. In a machine for the manufacture of sheet metal articles, the combination of a movable die; a stationary compound die comprising an outer die member having a recess which corresponds in shape with the end of said movable die, to cause the movable die to sever a blank from stock and also form a support for the moving die after such severing operation; and a tool located within, but spaced inwardly of the front face of the outer die, to act upon the blank after the movable die has come into engagement with the outer die; and an ejector in said stationary die for removing the blank from the stationary die.

12. In a machine for the manufacture of sheet metal articles, the combination of a movable die; a stationary compound die comprising an outer die member having a recess which corresponds in shape with the end of said movable die, to cause the movable die to sever a blank from stock and also form a support for the moving die after such severing operation; a tool located within, but spaced inwardly of the front face of, the outer die, to act upon the blank after the movable die has come into engagement with the outer die; an ejector in said stationary die for removing the blank from the stationary die; and means for positively actuating said ejector.

In witness whereof I affix my signature.

ALBERT HENRY SMITH.